Figure 3:
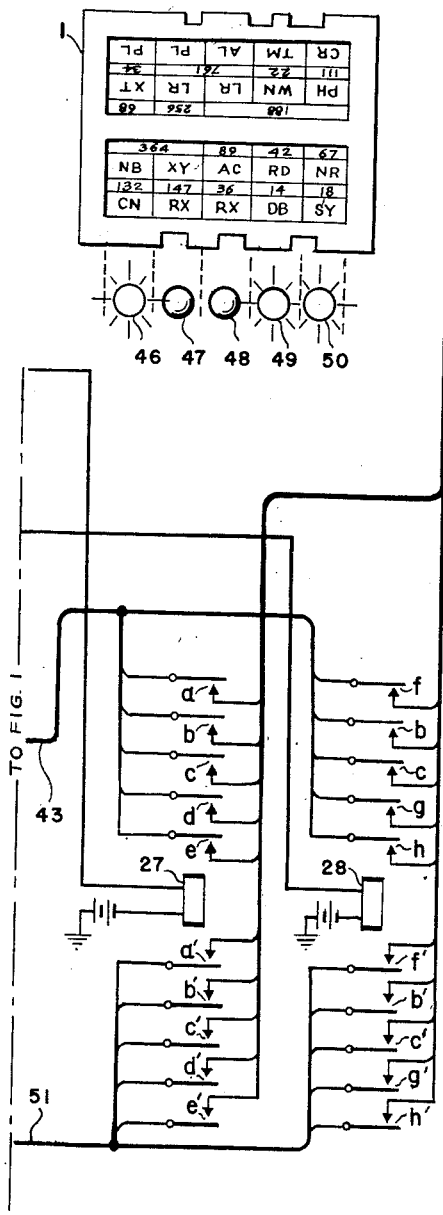

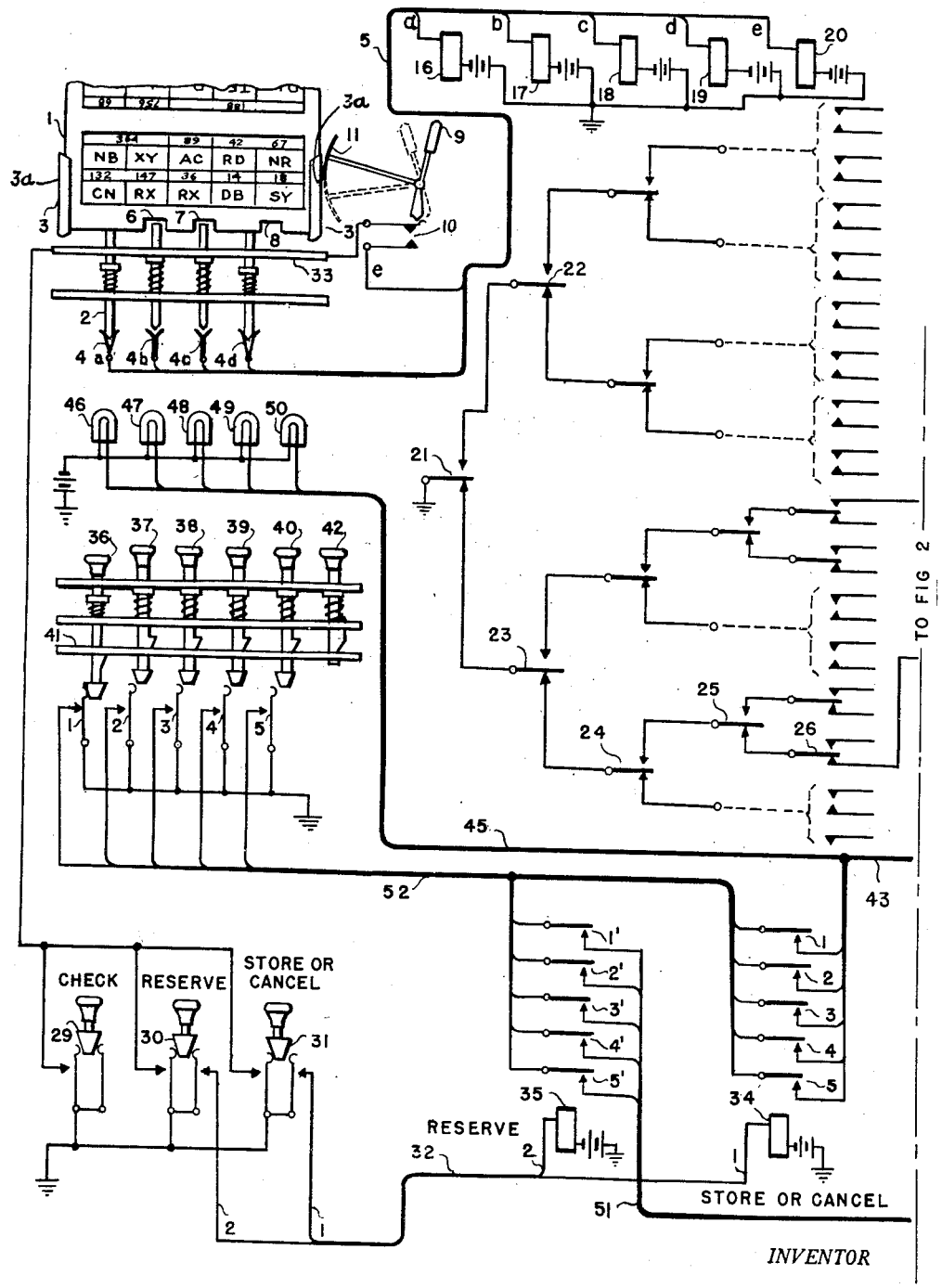
FIG: 1

Aug. 14, 1951  E. L. SCHMIDT  2,564,410
CODED PLATE SELECTOR FOR INVENTORY SYSTEM
Filed May 12, 1950
2 Sheets-Sheet 2

INVENTOR
EDWIN L. SCHMIDT
BY *W. H. Presson*
ATTORNEY

Patented Aug. 14, 1951

2,564,410

UNITED STATES PATENT OFFICE 2,564,410

CODED PLATE SELECTOR FOR INVENTORY SYSTEM

Edwin L. Schmidt, Croton-on-Hudson, N. Y., assignor to The Teleregister Corporation, New York, N. Y., a corporation of Delaware Application May 12, 1950, Serial No. 161,681

10 Claims. (Cl. 177—353)

This invention relates to selecting devices for the operation of an automatic inventory system. More particularly, the invention is directed to a coded plate selector and associated equipment whereby groups of storage elements in an inventory may be selected either for interrogation or for individual changes to be introduced therein, whether additively or subtractively.

An embodiment of the invention will be illustrated and described which is especially adapted for an inventory of seat reservations as required for airline passenger traffic, or for unit space reservations in case of cargo planes.

The booking of seat reservations for commercial airliners has become a serious problem. The public demands prompt information with regard to the possibility of making different flights at different times, and quite often reservations are wanted as many as ten days or more in advance. Under these circumstances, any one of the established air transport companies requires a very large number of storage units to be included in an adequate seat inventory system. The available space for a particular flight, or certain particular "legs" of a flight before any reservations are made, must be set up as a quantity corresponding to the total seat capacity of a particular plane scheduled for a particular day. Each flight between a departure point and a destination is usually given a flight number and a letter code to indicate the place of destination. As reservations are made the seat inventory of the plane is gradually reduced until no more available space can be allotted. The invention expedites the business of answering inquiries and of registering changes in an inventory, particularly of the type above referred to.

It is among the principal objects of the invention to provide inventory equipment including coded plates to be selectively used by an agent at any ticket office, and which will make the following provisions:

1. To provide facilities for posting and checkback operations in connection with the maintenance of an inventory, where numerous categories of items are involved.

2. To provide keyset equipment suitable for remotely controlling an electromechanical inventory system, and for deriving inventory status information respecting different groups of item storage units.

3. To provide instrumentalities such as coded plates having two functions, (a) to transmit code signals from a control station to the location of an inventory system, these code signals having a group selecting characteristic so that the status of a chosen group of inventory items may be reported back in response to one single order, and (b) to coordinate the individual status reports respecting each inventory item with designations of the same items to be found on said coded plate.

Figure 2:
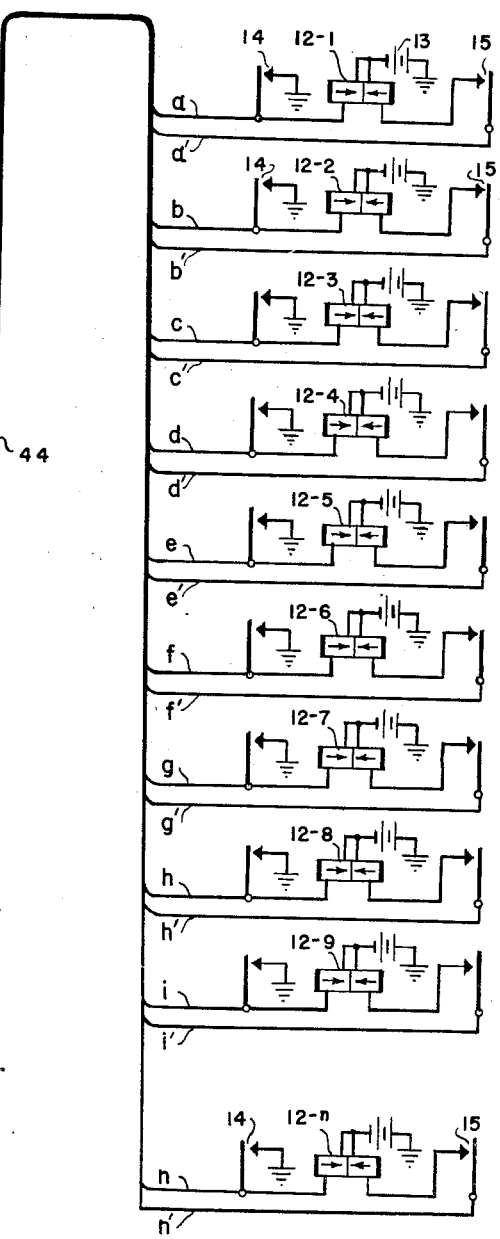

Other objects and advantages of the invention will become apparent upon reviewing the more detailed description which follows. Reference will be made to the accompanying drawings in which Fig. 1 shows diagrammatically a simplified circuit arrangement including a keyset, a keying device operable from a coded plate, and other means suitable for controlling an inventory system and for interrogating the status of different groups of storage units therein;

Fig. 2 is an extension of the circuit arrangement shown in Fig. 1 and should be viewed by placing it on the right-hand side of Fig. 1; and Fig. 3 is a picture of a representative coded plate adjacent which are certain indicator lamps.

The coded plate

A full view of a coded plate 1 is shown in Fig. 3. A fragmentary portion of such a plate is also shown in Fig. 1. Any of the edges of this plate may be notched for controlling the transmission of code signals, provided the plate is square. If, however, the plate is oblong it is usually sufficient to provide code notches along two of the edges, preferably the long edges. The edges of plate 1 (Fig. 1) are notched suitably for differential alignment with certain keying plungers 2. That is, there are two alternatively useful code combinations on each edge.

The positions of the notches in relation to the plungers 2, as shown in Fig. 1, are such that they become alternatively operable depending upon which side of the plate is to be viewed when inserting same in a pocket or slot in the agent's keyset. The guide portions 3 of such a pocket or slot are indicated in Fig. 1. The plungers 2 are constructed to make contact with individual contact elements 4a, 4b, 4c and 4d, constituting terminals of a multiple conductor transmission line 5.

The plate 1 when inserted in pocket guides 3, as shown in Fig. 1, has notches 6 and 7 opposed to two of the plungers 2 and failing to depress the same, whereas the unnotched portions of the plate press downwardly on the other two plungers and cause contact to be made with code keying contacts 4a and 4d, thus composing a code signal. If the plate 1 were to be reversed but with the same edge placed downwardly, then unnotched portions of the plate will depress plungers for contacting with contacts 4b, 4c and 4d, and at the same time notch 8 will be opposed to the plunger 2 at the extreme left so that no contact will be made with code keying contact 4a. The notches 6 and 7 will then be spaced intermediate between the other plungers 2.

From the above it will be seen that two different codes may be transmitted selectively, depending upon which way the plate is inserted in the pocket. Two more codes, entirely different from those mentioned, may also be selectively used according to the notching of the opposite edge of the plate so that if the plate is turned upside down this coded edge will be selectively operable and may also be reversed for transmitting two alternative signals. I thus have four different selections that can be made according to the manner in which the plate is inserted in the pocket. This number of selections may then be doubled by the use of a selecting key 9 which has two functions: one is to close contacts 10 and thus to provide an additional digit in the signaling code. The other function of key 9 is to operate a masking device which includes an opaque cover strip 11 to be raised or lowered so as to cover up one or the other of two rows of designations on the plate 1. In Fig. 1 the strip 11 is viewed edgewise in order to show how it may be pivotally mounted.

The plate 1 as shown in Fig. 3 appears to have on the bottom line a row of abbreviations which designate flight destinations. Above this is a row of index numbers for individual legs of certain flights, or for different non-stop flights. Thus, flight 18 corresponds to a flight from the departure point where the ticket is sold to a destination SY. If the status of five different storage units as designated along the bottom row is to be interrogated, key 9 will be thrown to the right so as to open contacts 10 and also to uncover the bottom row of flight and leg designations. The mask 11 will then cover the upper row of designations. By throwing key 9 to the left the fifth element of the code signal will be a "mark" and the group of storage units selected for interrogation will be those the identity of which is shown along the unmasked upper row of designations. As will presently be shown, the information to be given to the agent will depend upon the composition of a 5-unit code signal, four of the units being under control of plungers 2, and the fifth unit under control of key 9.

The 5-unit code gives a choice of 31 different code signals. The code plate 1 as herein shown may be inserted in the pocket four different ways, that is, either side facing the operator, and either coded edge at the bottom. This four-way insertion in combination with the use of the key 9 gives eight choices of storage unit groups. Individual storage units may be allocated to a number of different groups if desired. One advantage of this possibility in the case of using the storage units as a seat inventory is that the agent may in one operation interrogate several legs of a single flight, or several non-stop flights, and give the patron an immediate choice of available seats for flights in the morning, the afternoon or later in the day. Thus overlapping group selections may be made covering any desired periods of time for different departures.

The notching of plates 1 is only one of several alternative ways of transmitting code signals in conformity with the groups of storage units as designated along different lines of indexing on the plates themselves. Thus the plates may be punched with permuted rows of holes to be sensed by electrical contacts. Or the code composing contacts may be actuated by means of embossed nubbles or studs on the plate, or by inlays of insulating material which could be wedged between normally closed pairs of contacts.

Where the invention may be applied to inventory systems having a very large number of storage units, it will, of course, be necessary to expand the range of group selections of those units by the use of a multiplicity of differently coded plates 1 and by increasing the number of code elements in each selecting signal to be transmitted.

In a practical inventory system such as would be used by one of the established airlines, there will be provided a multiplicity of storage units each capable of maintaining a numerical registration of all seats sold for a flight between a takeoff point and the next scheduled landing. Or the complementary registration may be made in each storage unit, where the total number of available seats on a given plane is first set up as a starting inventory and seat sales are registered subtractively so that the registered remainder represents seats still available. In this case cancellations of seats are registered by adding back into the inventory.

The invention does not concern itself with the computing capabilities of the inventory system but only with the ability to select different storage units either to interrogate their status, or to change the registration of data therein. Hence I have chosen to illustrate an embodiment of the invention as applied to an inventory system of the simplest type, such as where each storage unit registers one or the other of two conditions. For example, these conditions may correspond with space available and space sold respectively.

It is envisioned that an airline must keep a registry of seats sold for at least ten days in advance. This requirement might involve the concurrent maintenance of inventories in 10,000 storage units. Only one storage unit per day would be needed for reservations on a plane having a non-stop schedule between a departure point and a given destination. For flights having one or more intermediate landing points a number of storage units are required, each corresponding to a different "leg" of the flight.

Prospective passengers usually wish to know about alternative flights on which seats are still available. Hence the need for interrogation of a multiplicity of inventories simultaneously. Also, since seats are sold for individual legs of certain flights there may be possibilities for selling a seat to one passenger for the first leg of a flight and to another passenger for the second leg. In such cases it is important for the agent to obtain instant reports on individual leg inventories.

From the foregoing description it will be apparent that the coded plates may be used advantageously to select different groups of storage units to be interrogated or in which to register changes individually. The circuit arrangement which interconnects an agent's keyset and the inventory system as herein shown does not have the capacity that would be required in practice, but the principles involved in applying the invention to a large inventory system would be the same.

The selective code signals as herein shown may be used to make any one of 31 different group selections of storage units. In each group there are five different storage units to be selected. These units may correspond with non-stop flights or different legs of flights as scheduled for any one day. Inventories for different days may be carried along concurrently by having multiple sections of the complete inventory system and by the use of date selecting keys on the agent's keyset, so that before making a group selection by means of a code plate the inventory section for a given date will first be selected, thus placing that section only under control of the selecting circuits as herein shown.

The number of digits in a binary selecting code determines, of course, the range of possible selections. Since I have here shown the use of four plungers 2 and a key 9 for coding purposes, the 5-unit code signals give 31 choices, where there must be a "mark" signal in at least one of the digits. If a 9-unit binary code were to be used, as is quite practical, then as many as 511 different group selections would be possible. In this case I would have nine separate conductors in cable 5, one of which would be controlled by contacts 10 on key 9, and the others of which would be individually controlled by each of eight plungers 2 and associated contacts 4.

In order to make as many as 511 different group selections only 64 code plates would be necessary since a single plate used in combination with key 9 provides eight alternative ways of forming the code signal, as has been explained above.

The five lamps 46—50 shown adjacent different vertical columns of flight and leg designations on the plate 1 (Fig. 3) are used to convey information as to the inventory status of five individual storage units. The code notches along the edge of the plate make selection of five particular storage units the identity of which is given by the legible data on the plate. The number of storage units to be included in a group selection agrees with the number of lamps that are provided and also with the number of columns of plate designations that are brought into alignment with the lamps. That number need have no relation to the number of selecting digits in the code signal however. In a practical embodiment I contemplate that there will be eight lamps and eight vertical columns of item designations on each side of a plate. Thus, with two horizontal lines of items adjacent each coded edge of the plate I would have access to as many as 64 different storage units, using a single plate, placing it different ways in the slot and operating the 2-way key 9 as needed.

The storage units

In Fig. 2 I show a multiplicity of relays 12—1, 12—2 . . . 12—n. Each relay has two opposing windings connected to a source 13, and two pairs of contact springs 14 and 15. Contacts 14 are in a locking circuit from the left-hand winding to ground, being in parallel with a control circuit. Another control circuit leads to contacts 15 and thence through the right-hand winding to the operating source 13. The right-hand winding can, therefore, be energized only after the relay has been locked up, and serves when energized to de-polarize the magnet core so as to release the relay.

It will thus be seen that each of the storage relays 12 is capable of being set to store an item of information, or to be released for cancelling such storage. I wish it to be understood that while a storage unit such as is shown and described herein is of a very simple type, the invention may readily be applied to systems where the storage units comprise multi-digit counting registers of any well known type.

The group selecting circuits

Referring again to Fig. 1 I show five code signalling circuits which are connected to contacts 4a, 4b, 4c, 4d and 10 and are included in a cable 5 leading to five different relays 16, 17, 18, 19 and 20. Each of these relays has an operating source connected to one terminal of its winding, whereas the other terminal is that to which one of the wires in cables 5 is connected.

The contacts under control of relays 16 to 20 inclusive are arranged in the form of a pyramid where movable contact 21 is operated by relay 16, movable contacts 22 and 23 by relay 17, etc. The relay contacts under control of relays 19 and 20 have been shown only in part merely for the sake of simplicity of the drawing. Two of the circuits, however, which may be selectively completed by either of two different permuted operations of the pyramid relays may be traced to two separate group selecting relays 27 and 28 (Fig. 2). For example, group selecting relay 28 will be operated by a selecting code which is transmitted when there is an uncut edge portion of plate 1 presented to plunger 4c, while all of the other plungers are confronted with the notches so that they remain unoperated, and while at the same time contacts 10 remain open. By the transmission of this code, relay 18 will operate and relays 16, 17, 19 and 20 will remain unoperated. The selecting effect of the pyramid relays is thus to close a circuit from ground through contacts 21, 23, 24, 25 and 26 leading to a conductor at the base of the pyramid which is connected individually to relay 28. If it is assumed that all of the 31 selective output circuits at the base of the pyramid are individually connected to different relays, such as 27 and 28, then the maximum number of group selections to be made by the system as shown will be 31. As heretofore explained, however, this limited range of selections is here given only to illustrate the principles of the invention. The range may be increased to include any desired number of group selecting relays such as 27 and 28. Relay 27 operates in response to a code signal which would operate relays 17, 18, 19 and 20. It will be apparent how other permuted operations of the relays 16 to 20 inclusive would cause other group selecting relays to be chosen.

Keys for mode of operation

In Fig. 1 I show three push button keys 29, 30 and 31 which are respectively labeled "Check," "Reserve" and "Store or cancel." If an operator desires to merely check the status of certain storage units the check key 29 will be depressed. If an inventory of available space units for reservations system is to be set up, key 31 will be depressed. After this initial setup of the inventory reservations may be made by the depression of key 30.

The check key 29 merely impresses ground potential on a common plate 33 which is in contact with each of the plungers 2, and which therefore enables these plungers to be used permutationally for impressing ground potential on the conductors of cable 5 and through the relays 16 to 20 inclusive.

When key 31 is operated the code selecting circuits of cable 5 have ground potential impressed upon them permutationally, and also a relay 34 is operated through a conductor 1 in cable 32. When a reservation is to be made depression of key 30 causes ground potential to be impressed upon the plunger guide plate 33 and upon selected conductors of cable 5, and at the same time relay 35 is operated.

Initial setup of the inventory

The initial setup of the inventory requires (1) operation of key 31, (2) insertion of a group selecting code plate 1 in its pocket, and (3) selective operation of certain keys 36 to 40 inclusive. These keys have an interlocking device which includes a shift plate 41 so that when any key is depressed it will release any key or keys previously depressed. After selecting operations by keys 36—40 have been completed, then a key 42, having no contacts associated with it, may be depressed for restoring other keys of this group.

The purpose of keys 36—40 is to selectively complete individual circuits through contacts of either relay 34 or relay 35 and through conductors in cable 43 or cable 51 to parallel-connected contacts of all relays 27, 28, etc., and thence to conductors of cable 44 which lead to one group of five storage unit relays as selected by the permuted operation of relays 16—20. The contacts with which conductors in cable 43 are connected, assuming that relay 27 has been operated by code selection of the plate 1, will provide individual control of circuits through contacts $a$, $b$, $c$, $d$ and $e$ of relay 27. Let it be assumed further that operation of relay 27 causes circuit closures to conductors $a$, $b$, $c$, $d$ and $e$ in cable 44 leading to the left-hand windings respectively of storage unit relays 12—1, 12—2, 12—3, 12—4 and 12—5. These storage units are at this time identified by the flight and leg designations on the plate 1, where each designation appears adjacent a respective one of the keys.

In the initial setup of an inventory of available space all of the relays 12 should stand in their locked-up state. To set them that way different groups of five will be selected by operation of different relays 27, 28 etc., as selected by the plates 1 and key 9 when all five of the keys 36—40 are depressed.

Reservations will be registered by unlocking the relays 12 and will relate to individual relays representing different flights and legs. Therefore the keys 36—40 will need to be individually operated according to requirements as shown by the designations on the plate 1. The same is true of making cancellations. So, in the one case, operation of relay 35 for making reservations closes the key contacts 1, 2, 3, 4 and 5 through conductors in cable 51, through contacts $a'$, $b'$, $c'$, $d'$ and $e'$ (if relay 27 is operated) and thence to contacts 15 and right-hand windings of the selected relays 12. Storage relays controlled in this manner will be released, and the effect on lamps 46—50 will be noticeable as will presently be explained.

In the case of giving effect to cancellations individual storage unit relays 12 will need to be controlled and this is done upon operation of key 31 and relay 34, after which the keys 36—40 may be selectively used to lock up whatever relay or relays are to store a "space available" condition.

From the above it will be seen that none of the keys 36—40 has any permanent association with different storage units, but these associations are determined by the code selecting effects of the instantly used plates 1. At the time of making a group selection each one of the keys 36—40 corresponds with a different one of the five columnar designations in the code plate. In each column a flight number or leg of flight is indicated, so the identification of a storage unit to be controlled by the operation of any key 36—40 is indicated only so long as a particular plate stands in the receptacle 3.

It will be noted that the conductors in cable 43 are individually connected to corresponding conductors in cable 45 leading to different indicator lamps 46, 47, 48, 49 and 50. Connection of a power source to the filaments of lamps 46—50 enables these lamps to be individually lighted corresponding to the locked-up condition of connected storage relays. These lamps will be lit, however, only upon operation of one of the group selecting relays 27, 28, etc., and upon connection to locked-up storage relays 12.

The mask 11 may be pivotally mounted at the points 3a to the sides of the guide portions 3 of the keyset structure or may be pivoted to other adjacent portions of the structure. The 2-way key 9 and its contacts 10 are also mounted within the keyset structure in which an aperture may be provided to enable the key to extend externally therefrom for ready manipulation.

Checking the status of storage units

Operation of the check key 29, as before stated, merely supplies ground potential to the conductive plate 33 with which the code plungers 2 are electrically connected. Let it be assumed that the operator wishes to test the storage units which would be selected by the operation of relay 27, this group having been selected by the insertion of a particular plate 1 in a particular manner into its pocket 3. Then such relay 27 makes a direct connection between the lamps 46—50 and the group-selected relays 12. Any of these relays which happen to be locked up will then complete corresponding lamp circuits through their closed contacts 14. One of these lamp circuits may be traced, by way of example, as follows: From battery through the filament of lamp 46 and one of the interconnected conductors in cables 45 and 43 to contact $a$ of relay 27, thence through a conductor $a$ in cable 44 to closed contacts 14 on locked-up relay 12—1 whereat the circuit is grounded. Lamp 46 is shown in Fig. 3 to be directly under the designations $$\frac{364}{NB}$$

and $$\frac{132}{CN}$$

The lighted lamp 46 would, in this case, indicate that space is available for a reservation on either the NB leg of flight 364, or the non-stop flight 132 to destination CN. Although the indication would appear to be ambiguous in this respect, it is not so in reality because one or the other of two storage units is selected depending upon the position of key 9, and only one of the designations is exposed to view, due to the shifting of the mask 11.

It is a feature of the invention that when the check key is operated after having placed a suitable code plate 1 in the pocket 3 and in the right position to read what information it provides, a code signal will be transmitted for selecting one of the group relays 27, 28, etc., so that all of the different flights or legs of flights designated along a horizontal line of the code plate will be interrogated and answer back signals given at one and the same time. Thus, although I have traced one answer-back circuit through lamp 46 it will be apparent that indicating circuits from lamps 47—50 would be made operable at the same instant and each individual lamp will show which of two conditions exists in the corresponding storage units according to their respective selections by different contact pairs in one of the group selecting relays 27, 28. If any of the storage relays 12 are locked up by closure of the locking contacts 14, this condition will be shown when the check key is operated, due to the fact that this check key operates the pyramid relays and closes the necessary contacts of a group selecting relay. This results in the closing of all five of the lamp circuits from their common battery terminal to the movable contacts 14. If any of these contacts are closed they cause the corresponding lamp to be lighted. If they are not closed, then the lamp remains extinguished.

Under certain conditions it may be preferable to reverse the functions of the two keys 30 and 31 so that when "space available" is to be stored in a storage relay this condition will be represented when the relay is de-energized and an open circuit condition exists through the locking contacts 14. When a reservation is made after that, key 31 would be operated together with one of the keys 36—40 and would cause a storage relay 12 to be locked up. This status would then be represented by a lighted lamp instead of an extinguished lamp, as was the case first described. Upon cancelling a reservation, or upon initially storing an available space item, the operation of key 30 will enable circuits to be completed as selected by the keys 36—40 where any of these circuits may be traced to selected storage relays as follows: Starting from ground on the movable contacts of pairs 1—5 under keys 36—40, individual conductors in cable 52 lead to contacts 1', 2', 3', 4' and 5' of relay 35 and thence through individual conductors of cable 51 to contacts shown on the underside of relays 27, 28, etc. Depending upon which of these relays is operated, circuits will be established to conductors a', b', c' etc., leading to contacts 15 on the storage relays. If any of these contacts are already open there is no need to effect any change in the status of the storage relay since it previously indicated the storage of available space. If, however, the relay happened to have been previously locked up, as by making a prior reservation, then the circuit is further traced through the right-hand winding of relay 12 and thence to the source 13. This winding bucks that of the left-hand winding and causes the relay to release in order to produce the unoperated condition of the relay which would indicate available space. This unoperated condition is then indicated by causing the previously lit lamp to be extinguished. The making of a reservation following this storage of available space would cause the lamp to be lighted, and subsequent inquiry for available space would have to be denied if the operation of the check key 29 causes a lamp to be lighted.

The advantage of operating the system in this manner, over that which was first described, is that in case any of the lamps should be burned out, without the knowledge of the operator, he would not lose an opportunity to sell space on a passenger plane flight when the dead lamp failed to show that space was available. He would, however, detect the condition of the lamp being burned out immediately upon attempting to sell this space because the operation of the key 31 would not thereafter produce a lighted lamp. But at the same time the relay 12 would operate and register the sale of the seat. This mode of detection of burnt-out lamps is more likely to present itself than when cancellations are called for under the first described method of using key 31, because the use of this key 31 is more infrequent, under the first described mode of operation.

*Advantages of group selection of the storage units*

The contacts on the upper side of relay 27 have been labeled a, b, c, d and e, whereas those on relay 23 have been labeled f, b, c, g, h. The contacts on the lower side of either of these relays have been given corresponding letters followed by the prime ('). In cable 44 there are pairs of conductors leading from the two windings of each storage relay to corresponding front contacts of different relays such as 27 and 28. Thus, contacts a and a' are connected or connectable to the windings of relay 12—1, contacts b and b' lead to contacts of relay 12—2, etc. There may be fewer storage relays than the total of contact pairs in the group selecting relays, so it may be arranged that certain of the storage relays can be selected as being within any of several groups. This possibility in indicated by the fact that contacts b are shown for both relays 27 and 28, whereas contacts a are individual to relay 27, and contacts f, g and h are individual to relay 28.

To illustrate the advantages of this arrangement let it be assumed that certain grouped flights between two airports are scheduled for morning and afternoon departure, and that certain other grouped flights between these same airports are scheduled for afternoon and evening departure. A customer may have no particular preference for his departure time as between morning and afternoon, but he is not interested in the evening flights. Therefore, a code plate will be chosen to give him the necessary information about all the morning and afternoon flights, as may be found by the operation of relay 27. When it comes to an inquiry for afternoon and evening flights, however, the storage units 12—2, 123, 12—6, 12—7 and 12—8 would need to be interrogated as can be done by the operation of relay 28, so all of these flights will then be brought up for check back purposes by operation of the check key 29. The morning flight conditions stored in units 12—1, 12—4 and 12—5 will not then be connected to the lamp system because of no interest in these flights at that time. The range of variation of the individual storage unit selections may also be made to cover other factors and conditions of reservation requirements having no relation to the time of day. For example, certain group selections may be made to include all of the flights of so-called "Constellation" planes, or they may be made to include only the non-stop flights between two airports. The flexibility of this group selection method is therefore unlimited.

Referring again to Fig. 3 it will be noted that the designations which are therein indicated upside down include flight 188 which has three legs PH, WN and LR. It will be noted that when this plate is inverted so as to read this information right side up and to send a code signal corresponding to these legs of one flight, the entire response presented to the inquirer will show whether there is available space on these individual legs of a flight, or whether no space is available on some one or more of them. The control of seat sales is therefore readily determined for a through flight, or for any individual leg of a flight, in accordance with the individually-lit and extinguished lamps 46—50.

It will readily be understood by those skilled in the art that the invention may be modified in various ways without departing from its spirit and scope. For one thing, it is not necessary to resort to relay storage units, such as the relays 12, in order to store and to report the status of individual inventory items. Other means of storage are well known and would equally well lend themselves to the use of the circuit arrangements and the code selecting plates with associated equipment, as herein disclosed.

What is claimed is:

1. In combination, a code plate having sectional areas of reading matter thereon for interpretive purposes, a receptacle arranged and adapted to hold any selected one of a plurality of differently coded plates, an inventory device having a plurality of item storage units therein, electrical means including keying contacts for transmitting code signals having a group-selecting effect upon said storage units, said contacts being permutationally closable by cooperation therewith of a coded portion of a chosen plate, means for changing the inventory status of individual ones of said storage units and an answer back system including an array of electroresponsive visual indicating devices disposed adjacent said receptacle and in alignment with the sectional areas of any plate which is held in said receptacle, said answer back system being operable to report the inventory status of storage units of a group selected by said keying contacts, the identification of individual units of that group being given by the coordination of energized and/or deenergized ones of said indicating devices with said sectional areas of the plate then held in said receptacle.

2. The combination according to claim 1 and including keying means for making status changes in respect to individual storage units of a selected group.

3. The combination according to claim 1 wherein said core plate is arranged to produce any one of a plurality of different group selections of storage units depending upon the manner in which it is inserted in said receptacle.

4. The combination according to claim 1 and including a dual purpose instrumentality operative to double the range of group selections in respect to said storage units and at the same time to display alternative sectional areas of said reading matter on the code plate.

5. In combination, a plurality of selector plates for the keying of code signals, a receptacle for utilizing any one of said plates, keying contacts operable under control of a permutationally coded portion of a plate while it is held in said receptacle, a sectionalized area on each of said plates whereon different informational designations are displayed, an array of electroresponsive visual indicating devices, each disposed in juxtaposition to respective sections of said area, a data storage device having a plurality of item storage units different groups of which are selectable in accordance with code signals from said keying contacts, and an answer back system arranged and adapted to control said indicating devices in accordance with a read-out of data from selected ones of said storage units, the correlation between storage units and informational designation sections on the utilized plate being thereby obtained and the status of each selected storage unit being manifested.

6. The combination according to claim 5 and including means supplementary to said keying contacts for expanding the variation range of selectability of the item storage unit groups, said means being also operable to shift the display of said informational designation sections from one to another of two rows thereof.

7. The combination according to claim 5 wherein said keying contacts are so positioned with respect to the coded portion of a plate which is inserted in said receptacle that reversal of the plate will produce a different code signal.

8. The combination according to claim 5 wherein said keying contacts are differently selected for actuation depending upon which one of different edges of the same plate is inserted at the bottom of said receptacle.

9. Apparatus for storing and reporting inventory data comprising a plurality of item storage units, electric circuit means for changing the status of each unit and for reporting its status without altering the same, interchangeable code plates and cooperating keying contacts for communicating with a selected group of said storage units through said circuit means, the selection being determined by the code pattern of code elements in a chosen plate, a row of electroresponsive visual indicating devices disposed adjacent a position whereat said chosen plate is enabled to function, identifying indicia on said plates arranged for alignment with said indicating devices, and means for so controlling said devices as to cause them to indicate the inventory status of all the storage units which are of the group selected by the code element pattern in the chosen plate, and at the same time to identify said units by the juxtaposition of said devices to said plate indicia.

10. In combination, an electrical signal transmitter having permutation signal-composing keys, a pocket, interchangeable code plates arranged and adapted to fit into said pocket and then to selectively actuate said keys, thereby to compose a desired code signal, an array of electroresponsive visual indicating devices disposed adjacent a viewable information-giving area on any plate which is chosen to be inserted in said pocket, an inventory system comprising a multiplicity of item storage units having circuits which connect the same with said transmitter, means responsive to signals initiated by said keys for selecting a group of storage units to be interrogated, and means operable to selectively energize said indicating devices, thereby to report the inventory status of the storage units in a selected group, each particular unit, when its status is so reported, being identified by readable indications on said information-giving areas.

EDWIN L. SCHMIDT.

No references cited